United States Patent [19]

Tabei et al.

[11] Patent Number: 5,128,430
[45] Date of Patent: Jul. 7, 1992

[54] PREPARATION OF POLYSILANES

[75] Inventors: Eiichi Tabei; Motoo Fukushima; Yoshinori Hida, all of Kawasaki; Akira Hayashida, Higashimurayama; Shigeru Mori, Kawasaki, all of Japan

[73] Assignee: Shin-Etsu Chemical Co., Ltd., Tokyo, Japan

[21] Appl. No.: 794,979

[22] Filed: Nov. 20, 1991

[30] Foreign Application Priority Data

Nov. 20, 1990 [JP] Japan .................................. 2-315015

[51] Int. Cl.$^5$ ............................................. C08G 77/06
[52] U.S. Cl. ........................................ 528/14; 528/10; 556/430
[58] Field of Search ..................... 528/14, 10; 556/430

[56] References Cited

U.S. PATENT DOCUMENTS

| 4,552,973 | 11/1985 | Feldner et al. | 556/469 |
| 4,590,253 | 5/1986 | Hasegawa et al. | 528/14 |
| 4,595,472 | 6/1986 | Haluska | 522/99 |
| 4,599,441 | 7/1986 | Kanner et al. | 556/469 |
| 4,783,516 | 11/1988 | Schilling, Jr. et al. | 528/14 |
| 4,900,861 | 2/1990 | Yokoyama et al. | 556/430 |

*Primary Examiner*—Melvyn I. Marquis
*Assistant Examiner*—Margaret W. Glass
*Attorney, Agent, or Firm*—Birch, Stewart, Kolasch & Birch

[57] ABSTRACT

Polysilanes are produced by reacting dihalosilanes in the presence of alkali metals, By carrying out the dihalosilane reaction in the presence of copper halide catalysts at temperatures of at least 100° C., higher molecular weight polysilanes are obtained in acceptable yields.

3 Claims, No Drawings

PREPARATION OF POLYSILANES

This invention relates to a method for preparing high molecular weight polysilanes using copper halide catalysts.

BACKGROUND OF THE INVENTION

For the synthesis of polysilanes, the almost only one method available in the prior art was by condensing dichlorosilane in the presence of metallic sodium. This method, however, had several problems including difficulty of reaction control, low yields of high molecular weight polysilanes, and formation of insoluble polymers as by products.

To overcome these problems, the following polysilane preparing methods were proposed, but these methods yet had some problems and were unsuccessful in fully solving the above-mentioned problems.

(1) Polysilanes are produced by dewatering condensation of $RSiH_3$ in the presence of $Cp_2MR_2$ complexes wherein M is Ti or Zr. See J. H. Harrod, ACS, Polym. Prepr., 28, 403 (1987). There are obtained polysilanes having a degree of polymerization of about 20. This method is unsuitable for preparing polysilanes having a higher degree of polymerization.

(2) Polysilanes are produced by anionic polymerization using biphenyl crosslinking agents. See Sakurai et al., Proceedings of the 56th Japan Chemical Society, Spring Meeting, 1988, 1 IV 03. This method is not commercially acceptable since the biphenyl crosslinking agents are difficult to synthesize.

(3) The prior art method is improved by adding crown ethers. See Fujino et al., Proceedings of the 56th Japan Chemical Society, Spring Meeting, 1988, 1 IV B12. The addition of crown ethers can promote reaction, yet the final yield of polysilanes remains substantially unchanged compared to the prior art method.

SUMMARY OF THE INVENTION

Therefore, an object of the present invention is to provide a simple, consistent method for preparing high molecular weight polysilanes in acceptable yields.

In preparing polysilanes having the general formula (1):

(1)

wherein $R^1$ and $R^2$, which may by the same or different, are independently a hydrogen atom or a monovalent hydrocarbon group, and n is an integer of at least 2, by reacting a dihalosilane of the general formula (2):

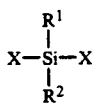
(2)

wherein $R^1$ and $R^2$ are as defined above and X is a halogen atom, in the presence of an alkali metal, the inventors have found that high molecular weight polysilanes are readily synthesized by using a copper halide catalyst and reacting the dihalosilane at a temperature of 100° C. or higher. Quite unexpectedly, formation of insoluble polymers is minimized and the yield of polysilanes is increased.

DETAILED DESCRIPTION OF THE INVENTION

The method of the present invention starts with a dihalosilane of the general formula (2).

(2)

In formula (2), $R^1$ and $R^2$ may be the same or different and are independently selected from the group consisting of a hydrogen atom and a monovalent hydrocarbon group. Preferred monovalent hydrocarbon groups are those having 1 to 12 carbon atoms, especially 1 to 6 carbon atoms, for example, substituted or unsubstituted alkyl, alkenyl, and aryl groups. X is a halogen atom such as chlorine, bromine and iodine. Dihalosilanes may be used alone or in admixture of two or more.

According to the present invention, the dihalosilanes are reacted in the presence of alkali metals such as lithium and sodium. The alkali metals are preferably used in particulate form. The amount of alkali metal used preferably ranges from about 2.0 to about 2.5 mol, especially from about 2.0 to about 2.1 mol per mol of the dihalosilane.

According to the present invention, the reaction of dihalosilanes in the presence of alkali metals is carried out using copper halides as a catalyst. The copper halides used herein include $CuCl$, $CuCl_2$, $CuBr$, $CuBr_2$, $CuI$, $CuI_2$, etc., with $CuI$ and $CuBr$ being preferred. The copper halide may be added to the reaction system by first adding the copper halide to the dihalosilane and then adding this mixture to alkali metal particles or alternatively, by first adding the copper halide to alkali metal particles and then adding the dihalosilane to the mixture. The amount of copper halide added preferably ranges from about 0.00001 to about 5 mol%, especially from about 0.001 to 0.5 mol% based on the moles of dihalosilane. Catalysis would be sometimes lost with excess amounts of the copper halide.

In the practice of the invention, reaction of the dihalosilanes is often carried out in inert solvents such as toluene, xylene, decane, and decalin. A flask is charged with an inert solvent and alkali metal particles, followed by agitation. The reaction temperature should be 100° C. or higher, preferably from 100° to 150° C., more preferably from 110° to 150° C. The object of the invention is not achieved at temperatures lower than 100° C. because sodium as the alkali metal cannot be present in fine particulate form. With stirring at temperatures of 100° C. or higher, the dihalosilane and copper halide are added to the flask whereupon reaction of dihalosilane with alkali metal takes place in an exothermic manner. Reaction is complete at a time when the alkali metal is substantially consumed.

Then the reaction mixture is post treated in a conventional manner. Typically, an alcohol is added to the reaction mixture for deactivating any residual alkali metal. The polymer product is collected by fractional precipitation. There is obtained a polysilane of the general formula (1):

wherein $R^1$ and $R^2$ are as defined above, and n is an integer of at least 2, preferably at least 100. In fact, polysilanes having a molecular weight of 200,000 to 1,000,000 are produced in acceptable yields. It is possible to effectively suppress formation of insoluble matter during the post treatment of the reaction mixture by adjusting the reaction mixture to pH 3 to 7 before or after alcohol addition for deactivating the alkali metal, and washing the mixture with water for removing the salt.

The present method insures simple synthesis of high molecular weight polysilanes and improves the yield of polysilanes by suppressing formation of insoluble polymers.

EXAMPLE

Examples of the present invention are given below by way of illustration and not by way of limitation.

EXAMPLE 1

A four-necked flask was charged with 4.8 grams of metallic sodium particles and 60 grams of xylene. A sodium dispersion was formed by heating at 138° C. and agitating the mixture. To the dispersion was added 0.019 grams of CuI. With stirring and heating at a temperature of 132° C., 19.1 grams of phenylmethyldichlorosilane was added dropwise to the dispersion. Exothermic reaction took place, turning the solution violet. The sodium seemed to disappear after heating and stirring continued for 6 hours. The reaction solution was cooled down to room temperature, completing the reaction.

About 5 ml of methanol was added to the reaction solution to deactivate the metallic sodium. The reaction solution was washed with water several times (about 100 ml of water in total) for dissolving and separating the sodium chloride resulting from the exothermic reaction. Then the organic layer was taken out and concentrated. Fractional precipitation from toluene/acetone system provided a polysilane of the formula:

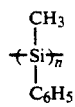

having a molecular weight of 1,020,000 in a yield of 15%.

EXAMPLE 2

A polysilane was produced by the same procedure as in Example 1 except that 0.0677 grams of CuCl$_2$ was used as the copper halide catalyst. The resulting polysilane had a molecular weight of 534,000 and a yield of 13%.

EXAMPLE 3

A polysilane was produced by the same procedure as in Example 1 except that 0.100 grams of CuCl was used as the copper halide catalyst. The resulting polysilane had a molecular weight of 720,000 and a yield of 18%.

COMPARATIVE EXAMPLE

A polysilane was produced by the same procedure as in Example 1 except that no copper halide catalyst was used. The resulting polysilane had a molecular weight of 100,000 and a yield of 10%.

It is evident that the addition of copper halide catalysts to the reaction system of dihalosilanes with alkali metals ensure synthesis of higher molecular weight polysilanes in acceptable yields.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. In a method for preparing a polysilane having the general formula (1):

wherein $R^1$ and $R^2$ are independently selected from the group consisting of a hydrogen atom and a monovalent hydrocarbon group, and n is an integer of at least 2, by reacting a dihalosilane of the general formula (2):

wherein $R^1$ and $R^2$ are as defined above and X is a halogen atom, in the presence of an alkali metal,
   the improvement wherein the dihalosilane is reacted in the presence of a copper halide catalyst at a temperature of at least 100° C.

2. The method of claim 1 wherein the copper halide catalyst is selected from the group consisting of CuCl, CuCl$_2$, CuBr, CuBr$_2$, CuI, and CuI$_2$.

3. The method of claim 1 wherein the copper halide catalyst is added in an amount of about 0.00001 to about 5 mol% based on the moles of the dihalosilane.

* * * * *